US010405233B2

(12) United States Patent
Negm (10) Patent No.: US 10,405,233 B2
(45) Date of Patent: Sep. 3, 2019

(54) ENHANCED OVERLOAD PROTECTION IN A TELECOMMUNICATIONS NETWORK (71) Applicant: Deutsche Telekom AG, Bonn (DE)

(72) Inventor: Mohamed Negm, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/580,284

(22) PCT Filed: Jul. 28, 2016

(86) PCT No.: PCT/EP2016/067982
§ 371 (c)(1),
(2) Date: Dec. 7, 2017

(87) PCT Pub. No.: WO2017/017173
PCT Pub. Date: Feb. 2, 2017

(65) Prior Publication Data
US 2018/0167847 A1 Jun. 14, 2018

(30) Foreign Application Priority Data
Jul. 28, 2015 (EP) ..................................... 15178615

(51) Int. Cl.
*H04L 12/26* (2006.01)
*H04W 28/08* (2009.01)
(Continued)

(52) U.S. Cl.
CPC ............. *H04W 28/08* (2013.01); *H04W 8/08* (2013.01); *H04W 28/02* (2013.01);
(Continued)

(58) Field of Classification Search
CPC ............. H04W 28/02; H04W 28/0215; H04W 28/0226; H04W 28/08
(Continued)

(56) References Cited

U.S. PATENT DOCUMENTS 8,861,535 B2 * 10/2014 Koodli .................. H04W 68/00
370/401
8,913,589 B2 * 12/2014 Zhang ..................... H04W 4/70
370/331
(Continued)

FOREIGN PATENT DOCUMENTS

EP 2600668 A1 6/2013
EP 2897430 A2 7/2015
WO WO 2015031202 A1 3/2015

OTHER PUBLICATIONS

"3rd Generation Partnership Project; Technical Specification Group Services and System Aspects; General Packet Radio Service (GPRS) enhancements for Evolved (E-UTRAN) access (Release 13)", 3GPP Standard; 3GPP TS 23.401, §RD Generation Partnership Project (3GPP), vol. SA WG2, No. V13.3.0, Jun. 16, 2015 (Jun. 16, 2015), pp. 1-324, XP050966262.

(Continued)

*Primary Examiner* — Dmitry Levitan
(74) *Attorney, Agent, or Firm* — Leydig, Voit & Mayer, Ltd.

(57) ABSTRACT

A method for enhanced overload protection in a telecommunications network includes: receiving, by a serving gateway entity, a plurality of downlink data packets for a subset of user equipments from at least one packet data network; assigning, by the telecommunications network, a first traffic priority information to a first part of the plurality of downlink data packets and a second traffic priority information to a second part of the plurality of downlink data packets, the first traffic priority information being associated with a lower traffic priority than the second traffic priority information; throttling, by the serving gateway entity, during an overload time interval, first downlink data notification (DDN) requests to the mobility management entity; and transmitting, by the serving gateway entity, during the
(Continued)

overload time interval, second DDN requests to the mobility management entity.

13 Claims, 2 Drawing Sheets (51) Int. Cl.
    *H04W 28/02*     (2009.01)
    *H04W 8/08*     (2009.01)
    *H04W 72/04*     (2009.01)
    *H04W 72/10*     (2009.01)
    *H04W 24/04*     (2009.01)
    *H04W 28/12*     (2009.01)

(52) U.S. Cl.
    CPC ....... *H04W 72/0486* (2013.01); *H04W 72/10* (2013.01); *H04W 24/04* (2013.01); *H04W 28/12* (2013.01)

(58) Field of Classification Search
    USPC .................. 370/229, 235, 310, 328, 349
    See application file for complete search history.

(56) References Cited

U.S. PATENT DOCUMENTS

| | | | |
|---|---|---|---|
| 9,060,294 B2 * | 6/2015 | Gupta | H04W 28/0252 |
| 9,191,859 B2 * | 11/2015 | Zakrzewski | H04W 28/10 |
| 9,603,044 B2 * | 3/2017 | Zhang | H04W 28/0226 |
| 9,930,650 B2 * | 3/2018 | Jeong | H04W 28/0268 |
| 2013/0128744 A1 * | 5/2013 | Landais | H04W 28/0221 370/236 |
| 2017/0019750 A1 * | 1/2017 | Palanisamy | H04W 28/0289 |

OTHER PUBLICATIONS

"3rd Generation Partnership Project; Technical Specification Group Core Network and Terminals; Study on General Packet Radio Service (GPRS) Tunneling Protocol for Control plane (GTP-C) overload control mechanisms (Release 12)", 3GPP Standard; Technical Report; 3GPP TR 29:807, V12.0.0, Jun. 24, 2014 (Jun. 24, 2014), pp. 1-78—XP051293338.

* cited by examiner

ENHANCED OVERLOAD PROTECTION IN A TELECOMMUNICATIONS NETWORK

CROSS-REFERENCE TO RELATED APPLICATIONS

This application is a U.S. National Phase application under 35 U.S.C. § 371 of International Application No. PCT/EP2016/067982, filed on Jul. 28, 2016, and claims benefit to European Patent Application No. EP 15178615.9, filed on Jul. 28, 2015. The International Application was published in English on Feb. 2, 2017 as WO 2017/017173 A1 under PCT Article 21(2).

FIELD

The present invention relates a method for enhanced overload protection in a telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein a subset of user equipments of the plurality of user equipments is in idle or inactive mode, wherein the telecommunications network comprises a mobility management entity and a serving gateway entity.

Furthermore, the present invention relates to a telecommunications network for enhanced overload protection in the telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein the telecommunications network comprises a mobility management entity and a serving gateway entity, wherein the serving gateway entity of the telecommunications network is configured to receive, from at least one packet data network, a plurality of downlink data packets for a subset of user equipments being in idle or inactive mode, wherein the plurality of downlink data packets are related to a transmission of payload data using communication bearers.

Furthermore, the present invention relates to a serving gateway entity for enhanced overload protection in a telecommunications network, wherein any data transmission of payload data between the telecommunications network and any of the plurality of user equipments requires at least one communication bearer being established involving the respective user equipment, wherein the serving gateway entity is configured to establish at least one communication bearer for provision of communication services of the telecommunications network to a plurality of user equipments, wherein the serving gateway entity of the telecommunications network is configured to receive, from at least one packet data network, a plurality of downlink data packets for a subset of user equipments being in idle or inactive mode, wherein the plurality of downlink data packets are related to a transmission of payload data using communication bearers.

Furthermore, the present invention relates to a program and to a computer program product for enhanced overload protection in a telecommunications network according to exemplary embodiments of the inventive method, telecommunications network and serving gateway entity.

BACKGROUND

In current telecommunications networks, radio resources and bandwidth resources are typically limited. Continually increasing number of mobile terminals and increasing access needs increase the importance of keeping a user equipment steadily connected under coverage (for example Long Term Evolution (LTE) coverage), especially in situations of relatively high network load in the core network which may be caused by control signaling and other data exchanges between the network elements of the telecommunications network.

Typically, overload protection mechanisms are employed to reduce the network load and provide reliable Internet Protocol (IP) services to the user equipments and its applications. Such overload protection mechanisms may be realized by throttling low priority data traffic (i.e. transmission of Internet Protocol (IP) data packets across the telecommunications network) in order to reduce the network load. Specifically, a mobility management entity (MME) overload protection mechanism includes the reduction of data traffic involving the mobility management entity. In order to forward Internet Protocol (IP) data packets directed to an idle or inactive user equipment, the serving gateway (SGW) entity may need to locate the idle or inactive user equipment by transmitting a downlink data notification (DDN) message—including a paging request—to the mobility management entity (MME) while buffering the Internet Protocol (IP) data packets. Upon reception of a downlink data notification (DDN) acknowledge message in response to the downlink data notification (DDN) message, the serving gateway (SGW) entity may forward the Internet Protocol (IP) data packets to the respective user equipment using at least one communication bearer.

As the number of user equipments under Long Term Evolution (LTE) coverage steadily increases, a relatively large number of service requests may be placed within relatively short time frames by a plurality of user equipments associated with the same mobility management entity (MME). Thus, a large number of downlink data notification (DDN) messages may be transmitted from the serving gateway (SGW) entity to the mobility management entity (MME) such that the mobility management entity (MME) may face an overload situation. For example, an overload situation may occur, when the memory required to process all incoming downlink data notification messages (including the paging requests) exceeds the available memory space at the mobility management entity (MME). In this case, a throttling mechanism may be initiated by the mobility management entity (MME) (upon reception of the downlink data notification (DDN) messages from a serving gateway (SGW) entity) in that the mobility management entity (MME) replies with a downlink data notification (DDN) acknowledge message—comprising a throttling request with throttling factor (TF) and throttling delay (TD)—to the serving gateway (SGW) entity in response to the downlink data notification (DDN) message. Subsequently, the serving gateway (SGW) entity may discard the transmission of further downlink data notification (DDN) messages to the mobility management entity (MME) in dependence of the throttling request included within the downlink data notification (DDN) acknowledge message.

However, the Internet Protocol (IP) data traffic is typically be prioritized according to the bearer allocation retention priority (ARP). This might lead to situations in which all communication bearers having the same bearer allocation retention priority (ARP) may be deactivated to free up resources resulting in an unwanted loss of important traffic and Internet Protocol (IP) data packets included in at least some of the deactivated communication bearers.

SUMMARY

In an exemplary embodiment, the present invention provides a method for enhanced overload protection in a telecommunications network. The telecommunications network is configured to provide communication services to a plurality of user equipments. Any data transmission of payload data between the telecommunications network and any of the plurality of user equipments requires at least one communication bearer being established involving the respective user equipment. A subset of user equipments of the plurality of user equipments is in idle or inactive mode. The telecommunications network comprises a mobility management entity and a serving gateway entity. The method comprises: receiving, by the serving gateway entity, a plurality of downlink data packets for the subset of user equipments from at least one packet data network, wherein the plurality of downlink data packets are related to a transmission of payload data using communication bearers; assigning, by the telecommunications network, a first traffic priority information to a first part of the plurality of downlink data packets and a second traffic priority information to a second part of the plurality of downlink data packets, the first traffic priority information being associated with a lower traffic priority than the second traffic priority information; throttling, by the serving gateway entity, during an overload time interval, first downlink data notification (DDN) requests to the mobility management entity, the first DDN requests being related to the first part of the plurality of downlink data packets with the first traffic priority information; and transmitting, by the serving gateway entity, during the overload time interval, second DDN requests to the mobility management entity, the second DDN requests being related to the second part of the plurality of downlink data packets with the second traffic priority information. The first traffic priority information is related to at least one of: a first access point name (APN) being used for the transmission of the first part of the data packets to the serving gateway entity; a first user location of a first user equipment of the subset of user equipments; or a combination of an allocation and retention priority (ARP) level and a first traffic handling priority (THP). The second traffic priority information is related to at least one of: a second APN being used for the transmission of the second part of the data packets to the serving gateway entity; a second user location of a second user equipment of the subset of user equipments; or a combination of an ARP level and a second THP.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a method for enhanced overload protection in a telecommunications network in which an unwanted loss of important Internet Protocol (IP) data traffic is reduced or avoided in case of an overload situation at the mobility management entity (MME) of the telecommunications network.

In an exemplary embodiment, the present invention provides a method for enhanced overload protection in a telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein a subset of user equipments of the plurality of user equipments is in idle or inactive mode, wherein the telecommunications network comprises a mobility management entity and a serving gateway entity, wherein the method comprises the following steps:

receiving, by the serving gateway entity, a plurality of downlink data packets for the subset of user equipments from at least one packet data network, wherein the plurality of downlink data packets are related to a transmission of payload data using communication bearers, assigning, by the telecommunications network, a first traffic priority information to a first part of the plurality of downlink data packets and a second traffic priority information to a second part of the plurality of downlink data packets, the first traffic priority information being associated with a lower traffic priority than the second traffic priority information, throttling, by the serving gateway entity, during an overload time interval, first downlink data notification (DDN) requests to the mobility management entity, the first downlink data notification (DDN) requests being related to the first part of the plurality of downlink data packets with the first traffic priority information, transmitting, by the serving gateway entity, during the overload time interval, second downlink data notification (DDN) requests to the mobility management entity, the second downlink data notification (DDN) requests being related to the second part of the plurality of downlink data packets with the second traffic priority information, wherein the first traffic priority information is related to at least one of:

a first access point name (APN) being used for the transmission of the first part of the data packets to the serving gateway entity, a first user location of a first user equipment of the subset of user equipments, a combination of an allocation and retention priority (ARP) level and a first traffic handling priority (THP), wherein the second traffic priority information is related to at least one of:

a second access point name (APN) being used for the transmission of the second part of the data packets to the serving gateway entity, a second user location of a second user equipment of the subset of user equipments, a combination of an allocation and retention priority (ARP) level and a second traffic handling priority (THP).

It is thereby advantageously possible according to the present invention that an enhanced overload protection mechanism is realized by a relatively fine-grained control over the throttling of Internet Protocol data traffic such that losses for important data traffic are reduced or avoided to a large extent. The enhanced overload protection method according to the present invention preferably enables an individual control with regard to the throttling of Internet Protocol (IP) data traffic (of services) associated with the same Quality of Service (QoS) parameters—in particular data packets associated with the same allocation and retention priority (ARP) or access point name maximum bit rate (APN-MBR)—but which are associated with different traffic priority information. It is preferred, according to the present invention, that the differentiation of traffic priority is not based on (only one) Quality of Service (QoS) parameter(s)—for example only based on the allocation and retention priority (ARP)—but that the differentiation of traffic priority is based on traffic priority information (which is interchangeably also called traffic priority information element within the context of the present invention) being related to at least one of an access point name (APN), a user location and a combination of allocation and retention priority (ARP) and traffic handling priority (THP). This means, in particular, that the first traffic priority information is related to at least one of the first access point name (APN), the first user location and the combination of an allocation and retention priority (ARP) level and the first traffic handling priority (THP) and that the second traffic priority information is related to at least one of the second access point name (APN), the second user location and the combination of an allocation and retention priority (ARP) level and the second traffic handling priority (THP). According to the present invention it is thereby advantageously possible that operators are enabled to have a relatively fine-grained control over the throttling of data packets within the telecommunication network as compared to the state of the art.

According to the present invention it is preferred that the overload time interval is retrieved, by the serving gateway entity, from a downlink data notification (DDN) acknowledge message being received from the mobility management entity in response to a downlink data notification (DDN) request.

Thereby, it is advantageously possible to enable the mobility management entity (MME) not only to initiate the enhanced overload protection according to the present invention, but also to control the length of the overload time interval in dependence such that the overload time interval is preferably adapted to a level of overload (for example a level of memory usage) at the mobility management entity (MME). Alternatively or additionally, it is preferred according to the present invention that the overload time interval is a predetermined overload time interval existing within the serving gateway entity (for example a default overload time interval being configured upon deployment of the serving gateway entity).

According to the present invention it is preferred that the method comprises the further steps of:

activating, by the telecommunications network, the communication bearers for transmission of the second part of the plurality of data packets to the subset of user equipments, transmitting, from the serving gateway entity to the respective user equipments of the subset of user equipments, the second part of the plurality of data packets using the communication bearers.

Thereby, it is advantageously possible to realize the enhanced overload protection not only at the mobility management entity (MME), but also in other parts of the telecommunications network by reducing the data traffic between the serving gateway entity and the radio access network in that—preferably only—the second part of the plurality of data packets are forwarded to the respective user equipments and in that the first part of the plurality of data packets are discarded at the serving gateway (SGW) entity.

According to the present invention it is preferred that the plurality of downlink data packets are related to a transmission of payload data using communication bearers according to different allocation and retention priority (ARP) levels or wherein the plurality of downlink data packets are related to a transmission of payload data using communication bearers according to the same allocation and retention priority (ARP) level.

Thereby, it is advantageously possible to realize a relatively fine-grained control over which traffic to be throttled and which traffic to be forwarded in that parameters (i.e. first and second traffic priority information) other than the allocation and retention priority (ARP) are used for defining the priority traffic. According to the present invention it is preferred that the traffic priority information comprises a combination of traffic priorities (for at least the first and/or the second part of the plurality of data packets, respectively), wherein the combination of traffic priorities depends on at least one of the service, location, type of traffic and subscriber type.

According to the present invention it is preferred that the method includes the further steps of:

detecting, by the serving gateway entity, the first access point name in dependence of the first part of the plurality of downlink data packets and the second access point name in dependence of the second part of the plurality of downlink data packets, assigning, by the serving gateway entity, a first access point name (APN) priority level to the first part of the plurality of downlink data packets upon detection of the first access point name and a second access point name (APN) priority level to the second part of the plurality of downlink data packets upon detection of the second access point name.

Thereby, it is advantageously possible to provide an enhanced overload protection by using an access point name (APN) based priority traffic information. The serving gateway (SGW) entity is preferably access point name (APN) aware. This means, in particular, that the serving gateway (SGW) entity is configured to identify the access point name (APN) being used (for the transmission of the data packets to the serving gateway entity) and to identify, based on the access point name (APN) being used, whether the traffic (i.e. the flow of data packets) is high priority traffic (which means that the data packets are forwarded to the respective user equipment) or low priority traffic (which means that the data packets and/or respective downlink data notification messages are subject to throttling).

According to the present invention it is preferred that the method includes the further steps of:
- detecting, by the serving gateway entity, the first user location in dependence of the first part of the plurality of downlink data packets and the second user location in dependence of the second part of the plurality of downlink data packets,
- assigning, by the serving gateway entity, a first user location priority level to the first part of the plurality of downlink data packets upon detection of the first user location and the second user location priority level to the second part of the plurality of downlink data packets upon detection of the second user location.

Thereby, it is advantageously possible to provide an enhanced overload protection by using a user location based priority traffic information. The serving gateway (SGW) entity is preferably a user location aware node. This means, in particular, that the serving gateway (SGW) entity is configured to identify the user location (i.e. of the user equipment the data packets are directed to) and is configured to detect, based on the detected user location, if the traffic (i.e. the flow of data packets) is high priority traffic (which means that the data packets are forwarded to the respective user equipment) or low priority traffic (which means that the data packets and/or respective downlink data notification messages are subject to throttling).

According to the present invention it is preferred that the second user location is detected based on an identification of predefined location configuration data and/or based on a last tracking area being reported to the serving gateway entity.

Thereby, it is advantageously possible to enhance the overload protection method by using an identification of predefined location configuration data and/or based on a last tracking area being reported to the serving gateway entity.

According to the present invention it is preferred that the method includes the further steps of:
- detecting, by the serving gateway entity, a first subscriber class information in dependence of the first part of the plurality of downlink data packets and a second subscriber class information in dependence of the second part of the plurality of downlink data packets,
- assigning, by the serving gateway entity, a first subscriber class priority level to the first part of the plurality of downlink data packets upon detection of the first subscriber class information and a second subscriber class priority level to the second part of the plurality of downlink data packets upon detection of the second subscriber class information.

Thereby, it is advantageously possible to provide an enhanced overload protection by using priority traffic information based on a combination of allocation and retention priority (ARP) and traffic handling priority (THP). Thus, the serving gateway (SGW) entity is configured to differentiate the subscribers according to subscriber classes (for example Gold class, Silver Class and/or other classes) and to detect, based on the subscriber class associated with the respective user equipment, if the traffic (i.e. the flow of data packets) is high priority traffic (which means that the data packets are forwarded to the respective user equipment) or low priority traffic (which means that the data packets and/or respective downlink data notification messages are subject to throttling).

According to the present invention it is preferred that the first and second subscriber class priority level are determined based on a combination of the one allocation and retention priority (ARP) level and a traffic handling priority (THP) level.

Thereby, it is advantageously possible that the subscriber classes are mapped to different allocation and retention priority (ARP) and traffic handling priority (THP) combinations within the user profile of the respective subscriber. Thereby, it is advantageously possible to improve the Quality of Service (QoS) especially during overload situations at the mobility management entity (MME) for high priority subscribers in that the traffic priority information is determined based on the combined value of the traffic handling priority (THP) and the value of the allocation and retention priority (ARP). Thereby it is advantageously possible that data packets associated with high priority subscribers are forwarded to the subscribers during overload situations at the mobility management entity (MME).

Furthermore, the present invention relates to a telecommunications network for enhanced overload protection in the telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein the telecommunications network comprises a mobility management entity and a serving gateway entity, wherein the serving gateway entity of the telecommunications network is configured to receive, from at least one packet data network, a plurality of downlink data packets for a subset of user equipments being in idle or inactive mode, wherein the plurality of downlink data packets are related to a transmission of payload data using communication bearers, wherein the telecommunications network is configured to assign a first traffic priority information to a first part of the plurality of downlink data packets and a second traffic priority information to a second part of the plurality of downlink data packets, the first traffic priority information being associated with a lower traffic priority than the second traffic priority information, wherein the serving gateway entity is configured to throttle, during an overload time interval, first downlink data notification (DDN) requests to the mobility management entity, the first downlink data notification (DDN) requests being related to the first part of the plurality of downlink data packets with the first traffic priority information, wherein the serving gateway entity is configured to transmit, during the overload time interval, second downlink data notification (DDN) requests to the mobility management entity, the second downlink data notification (DDN) requests being related to the second part of the plurality of downlink data packets with the second traffic priority information,
wherein the first traffic priority information is related to at least one of:
- a first access point name (APN) being used for the transmission of the first part of the data packets to the serving gateway entity,
- a first user location of a first user equipment of the subset of user equipments,
- a combination of an allocation and retention priority (ARP) level and a first traffic handling priority (THP), wherein the second traffic priority information is related to at least one of:
  a second access point name (APN) being used for the transmission of the second part of the data packets to the serving gateway entity,
  a second user location of a second user equipment of the subset of user equipments,
  a combination of an allocation and retention priority (ARP) level and a second traffic handling priority (THP).

Thereby, it is advantageously possible according to the present invention to provide a telecommunications network for enhanced overload protection in the telecommunications network, especially for enhanced overload protection for the mobility management entity of the telecommunications network, in which an unwanted loss of important Internet Protocol (IP) data traffic is reduced or avoided in case of an overload situation at the mobility management entity (MME) of the telecommunications network.

According to the present invention it is preferred that the telecommunications network is configured to activate the communication bearers for transmission of the second part of the plurality of data packets to the subset of user equipments, wherein the serving gateway entity is configured to transmit the second part of the plurality of data packets to the respective user equipments of the subset of user equipments using the communication bearers.

Thereby, it is advantageously possible to provide a telecommunications network with enhanced overload protection within the telecommunications network not only at the mobility management entity (MME), but also in other parts of the telecommunications network. The enhanced overload protection is thereby realized by reducing the data traffic between the serving gateway entity and the radio access network in that—preferably only—the second part of the plurality of data packets are forwarded to the respective user equipments and in that the first part of the plurality of data packets are discarded at the serving gateway (SGW) entity.

Furthermore, the present invention relates to a serving gateway entity for enhanced overload protection in a telecommunications network, wherein any data transmission of payload data between the telecommunications network and any of the plurality of user equipments requires at least one communication bearer being established involving the respective user equipment, wherein the serving gateway entity is configured to establish at least one communication bearer for provision of communication services of the telecommunications network to a plurality of user equipments, wherein the serving gateway entity of the telecommunications network is configured to receive, from at least one packet data network, a plurality of downlink data packets for a subset of user equipments being in idle or inactive mode, wherein the plurality of downlink data packets are related to a transmission of payload data using communication bearers, wherein the serving gateway entity is configured to assign a first traffic priority information to a first part of the plurality of downlink data packets and a second traffic priority information to a second part of the plurality of downlink data packets, the first traffic priority information being associated with a lower traffic priority than the second traffic priority information, wherein the serving gateway entity is configured to throttle, during an overload time interval, first downlink data notification (DDN) requests to the mobility management entity, the first downlink data notification (DDN) requests being related to the first part of the plurality of downlink data packets with the first traffic priority information, wherein the serving gateway entity is configured to transmit, during the overload time interval, second downlink data notification (DDN) requests to the mobility management entity, the second downlink data notification (DDN) requests being related to the second part of the plurality of downlink data packets with the second traffic priority information,
wherein the first traffic priority information is related to at least one of:
  a first access point name (APN) being used for the transmission of the first part of the data packets to the serving gateway entity,
  a first user location of a first user equipment of the subset of user equipments,
  a combination of an allocation and retention priority (ARP) level and a first traffic handling priority (THP),
wherein the second traffic priority information is related to at least one of:
  a second access point name (APN) being used for the transmission of the second part of the data packets to the serving gateway entity,
  a second user location of a second user equipment of the subset of user equipments,
  a combination of an allocation and retention priority (ARP) level and a second traffic handling priority (THP).

Thereby, it is advantageously possible according to the present invention to provide a serving gateway (SGW) entity, preferably for use in a telecommunications network according to the present invention, for enhanced overload protection at a mobility management entity of the telecommunications network the serving gateway entity is connected to. Exemplary embodiments of the inventive serving gateway entity preferably ensure that an unwanted loss of important Internet Protocol (IP) data traffic is reduced or avoided in case of an overload situation at the mobility management entity (MME) of the telecommunications network when the serving gateway (SGW) entity is used within a telecommunications network according to the present invention.

Additionally, the present invention relates to a program comprising a computer readable program code which, when executed on a computer or on a network node of a telecommunications network, or in part on the computer and in part on the network node of the telecommunications network, causes the computer or the network node of the telecommunications network to perform the method according to the present invention.

Still additionally, the present invention relates to a computer program product for enhanced overload protection in a telecommunications network, the computer program product comprising a computer program stored on a storage medium, the computer program comprising program code which, when executed on a computer or on a network node of the telecommunications network, or in part on the computer and in part on the network node of the telecommunications network, causes the computer or the network node of the telecommunications network to perform the method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
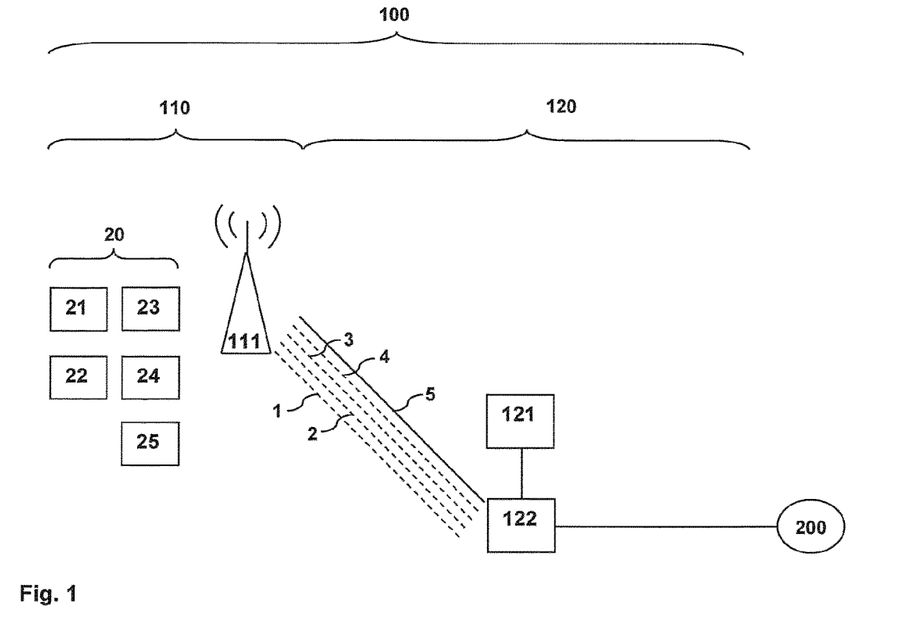
FIG. 1 schematically illustrates a mobile telecommunications network for enhanced overload protection in the telecommunications network, wherein the mobile communication network serves as an example of a telecommunications network according to the present invention.

In FIG. 1, a telecommunications network 100 for enhanced overload protection according to the present invention is schematically illustrated. The telecommunications network 100 is implemented as a mobile telecommunication network comprising a radio access network 110 and a core network 120. The telecommunications network 100 is configured to provide communication services to a plurality of user equipments 20. Here, the plurality of user equipments 20 are located within a coverage area of an eNodeB 111 of the radio access network 110 of the telecommunication network 100. The telecommunication network 100 is configured to provide communication services—for example Internet services or Internet multimedia subsystem (IMS) services—to the plurality of user equipments 20 via the eNodeB 111 of the radio access network 110. The core network 120 of the telecommunications network 100 comprises a mobility management entity (MME) 121 and a serving gateway (SGW) entity 122 wherein the serving gateway (SGW) entity 122 is configured to receive downlink data packets from an upstream source. Here, the upstream source is realized by or within at least one packet data network (PDN) 200 being connected to the core network 120 of the telecommunications network 100.

A subset of user equipments 21, 22 of the plurality of user equipments 20 is shown in idle or inactive mode. The subset of user equipments 21, 22 include at least a first user equipment 21 and a second user equipment 22. Any data transmission of payload data between the telecommunications network 100—in particular the serving gateway entity 122 of the telecommunications network—and the first user equipment 21 of the subset of the plurality of user equipments 20 requires at least one first communication bearer 1 being established involving the first user equipment 21. Establishing a communication bearer preferably includes allocating resources and activating the communication bearer. Any data transmission of payload data between the telecommunications network 100—in particular the serving gateway entity 122 of the telecommunications network 100—and the second user equipment 22 of the subset of the plurality of user equipments 20 requires at least one second communication bearer 2 being established involving the second user equipment 22. Here, the at least one first communication bearer 1 and the at least one second communication bearer 2 are shown in dashed lines because the at least one first and second communication bearers 1, 2 are deactivated to free up resources in case the first and second user equipments 21, 22 are in idle or inactive mode. The forwarding of the downlink data packets from the serving gateway (SGW) entity 122 to the idle or inactive subset of user equipments 21, 22 requires locating the idle or inactive subset of user equipments 21, 22 by the telecommunication network 100. The serving gateway (SGW) entity 122 is in particular configured to initiate the paging of the idle or inactive subset of user equipments 21, 22 by transmitting a downlink data notification (DDN) message—including a paging request—to the mobility management entity (MME) 121 while buffering the plurality of downlink data packets directed to the subset of user equipments 21, 22. In non-overload situations—in particular before the beginning or after expiry of an overload time interval—the serving gateway (SGW) entity 122, in particular, forwards the downlink data packets to the respective subset of user equipment 21, 22 using the respective at least one communication bearer 1, 2 in dependence of a downlink data notification (DDN) acknowledge message received from the mobility management entity (MME) 121 in response to the downlink data notification (DDN) message.

According to exemplary embodiments of the inventive method for enhanced overload protection, the method comprises receiving—by the serving gateway entity (SGW) 122—a plurality of downlink data packets for the subset of user equipments 21, 22 from at least one packet data network 200, wherein the plurality of downlink data packets are related to a transmission of payload data using (the first and second) communication bearers 1, 2. In case that the subset of user equipments 21, 22 are in idle or inactive mode, the serving gateway entity 122 preferably buffers the downlink data packets.

An overload situation at the mobility management entity (MME) 121 may be triggered via the serving gateway (SGW) entity 122 in case the serving gateway (SGW) entity 122 tries to locate the idle user equipments 21, 22 by sending a relatively large number of downlink data notification (DDN) requests—within a relatively short time interval—resulting in an overload situation due to the large number of downlink data notification (DDN) requests to be processed by the mobility management entity (MME) 121 and the large number of paging procedures to be performed by the mobility management entity (MME) 121. In case that an overload protection according to the state of the art is implemented, an overload situation could only be realized at the cost of unwanted data loss and/or with relatively complex configuration efforts.

In contrast thereto, the present invention provides a method for enhanced overload protection in the telecommunications network 100 in which an unwanted loss of important downlink data traffic is reduced or avoided in case of an overload situation at the mobility management entity (MME) 121 of the telecommunications network 100. According to exemplary embodiments of the inventive method, the telecommunications network 100 assigns a first traffic priority information to a first part of the plurality of downlink data packets and a second traffic priority information to a second part of the plurality of downlink data packets. The first traffic priority information being associated with a lower traffic priority than the second traffic priority information. Thereby, it is advantageously possible to realize a (relatively fine-grained) throttling of at least the first part of the plurality of downlink data packets based on the first and second traffic priority information.

The first and second traffic priority information are preferably used either instead of or in addition to an allocation and retention priority (ARP), but are especially different from the allocation and retention priority (ARP). For example, the plurality of downlink data packets are related to a transmission of payload data using communication bearers 1, 2 according to different allocation and retention priority (ARP) levels or—alternatively—are related to a transmission of payload data using communication bearers 1, 2 according to the same allocation and retention priority (ARP) level.

According to the present invention, the method comprises throttling first downlink data notification DDN requests to the mobility management entity 121, by the serving gateway entity 122, during an overload time interval, wherein the first downlink data notification (DDN) requests being related to the first part of the plurality of downlink data packets with the first traffic priority information. According to the present invention, the method comprises transmitting second downlink data notification (DDN) requests to the mobility management entity 121, by the serving gateway entity 122, during the overload time interval, wherein the second downlink data notification (DDN) requests are related to the second part of the plurality of downlink data packets with the second traffic priority information. It is preferred, according to the present invention that the first downlink data notification (DDN) requests are throttled independent of the allocation and retention priority (ARP) associated with the communication bearer to be used for the transmission of the first part of the downlink data (DDN) notification request. Preferably, the first downlink data notification (DDN) requests are throttled according to a throttling request by the mobility management entity (MME) transmitted to the serving gateway (SGW) entity using the downlink data notification (DDN) acknowledge message. Preferably, the throttling request of the mobility management entity (MME) 121 includes a throttling factor (TF) and a throttling delay (TD) (overload time interval) to be applied for the throttling of the first downlink data packets.

According to the present invention it is particularly preferred that the first traffic priority information is related to at least one of:
 a first access point name (APN) being used for the transmission of the first part of the data packets to the serving gateway entity 122,
 a first user location of a first user equipment 21 of the subset of user equipments 21, 22,
 a combination of an allocation and retention priority (ARP) level and a first traffic handling priority (THP),
wherein the second traffic priority information is related to at least one of:
 a second access point name (APN) being used for the transmission of the second part of the data packets to the serving gateway entity 122,
 a second user location of a second user equipment 22 of the subset of user equipments 21, 22,
 a combination of an allocation and retention priority (ARP) level and a second traffic handling priority (THP).

Thereby, it is advantageously possible to realize a selective throttling of downlink data packets (associated to different bearers associated with the same or different values of the respective allocation and retention priority (ARP) level) depending on the first and second traffic priority information.

In FIG. 1, a further subset of user equipments 23, 24 is also shown in idle or inactive mode, wherein the further subset of user equipments 23, 24 includes at least a third user equipment 23 and a fourth user equipment 24. Any data transmission of payload data between the telecommunications network 100—in particular the serving gateway entity 122 of the telecommunications network—and the third user equipment 23 of the further subset of the plurality of user equipments 20 requires at least one third communication bearer 3 being established involving the third user equipment 23. Any data transmission of payload data between the telecommunications network 100—in particular the serving gateway entity 122 of the telecommunications network— and the fourth user equipment 24 of the further subset of the plurality of user equipments 20 requires at least one fourth communication bearer 4 being established involving the fourth user equipment 24. Here, the at least one third communication bearer 3 and the at least one fourth communication bearer 4 are shown in dashed lines because the at least one third and fourth communication bearers 3, 4 are deactivated to free up resource when the third and fourth user equipments 23, 24 are in idle or inactive mode. Additionally, a still further subset of user equipments 25 is shown in active mode. The still further subset of user equipments 25 include at least one fifth user equipment 25 being in active mode. Any data transmission of payload data between the telecommunications network 100—in particular the serving gateway entity 122 of the telecommunications network— and the fifth user equipment 25 of the still further subset of the plurality of user equipments 20 requires at least one fifth communication bearer 5 being established involving the fifth user equipment 25. Here, the at least one fifth communication bearer 5 is shown in solid line because the at least one fifth communication bearers 5 is activated for transmission of data packets directed to the fifth user equipment 25 (being in active mode). Thus, the serving gateway entity 122 forwards all downlink data packets to the further subset of activated user equipments 25—in particular without transmitting, additionally, a downlink data notification (DDN) message (related to the downlink data packets being directed to the subset of activated user equipments 25) to the mobility management entity (MME) 121.

Figure 2:
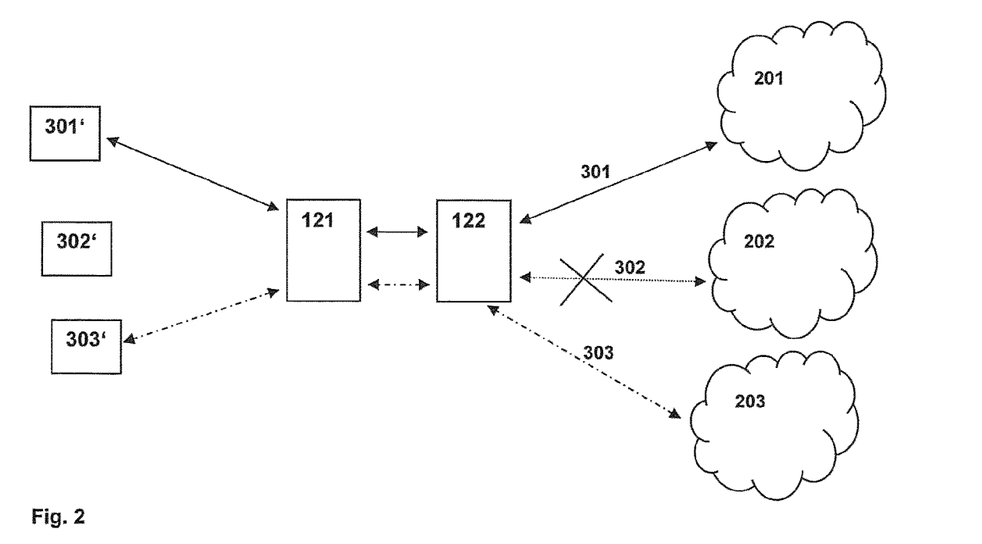
FIG. 2 schematically illustrates the situation of the traffic priority information being related to at least one access point name (APN) being used for the transmission of the data packets to the serving gateway entity according to an exemplary embodiment.

In FIG. 2, the situation of the traffic priority information being related to at least one access point name (APN) being used for the transmission of the data packets to the serving gateway entity according to exemplary embodiments of the inventive method is schematically illustrated. In FIG. 2, on the right side, a first, second and third access point name (APN) are illustrated by reference numerals 201, 202, 203. In FIG. 2, on the left side, a first, second and third user are illustrated by reference numerals 301', 302', 303'. Here, downlink data packets directed to the first user 301' are transmitted to the serving gateway entity 122 using the first access point name (APN) (cf. reference numeral 201). Downlink data packets directed to the second user 302' are transmitted to the serving gateway entity 122 using the second access point name (APN) (cf. reference numeral 202). Downlink data packets directed to the third user 302' are transmitted to the serving gateway entity 122 using the third access point name (APN) (cf. reference numeral 203).

According to one exemplary embodiment of the present invention, the first part of the plurality of downlink data packets are related to a transmission to the first and third user equipment 21, 23 using the first and third communication bearers 1, 3 (as illustrated in FIG. 1) and the second part of the plurality of downlink data packets are related to a transmission to the second and fourth user equipment 22, 24 using the second and fourth communication bearers 2, 4 (as illustrated in FIG. 1). In this example, the first, second, third and fourth communication bearers 1, 2, 3, 4 are associated with the same value of the allocation and retention priority (ARP) level.

The first and second part of the downlink data packets are received via different access point names—here, for example, via the first and second access point names (APNs) 201, 202. Based on a priority of the access point names, the serving gateway (SGW) entity 122 assigns the first traffic priority information to the first part of the data packets and the second traffic priority information to the second part of the data packets. Therefore, the downlink data notification (DDN) messages related to the first part of the plurality of data packets are throttled (for example according to a throttling factor between 0 and 1) by the serving gateway entity and therefore the first and third communication bearers 1, 3 remain deactivated since the first and third user equipments 21, 23 are in idle or inactive mode and the transmission of respective downlink data notification (DDN) messages to the mobility management entity (MME) 121 is thus prevented. However, the downlink data notification (DDN) messages related to the second part of the plurality of data packets are not throttled, but transmitted, by the serving gateway (SGW) entity 122, to the mobility management entity (MME) 121. Therefore, the second and fourth communication bearers 2, 4—which are required for the transmission of the second part of the plurality of downlink data packets to the second and fourth user equipments 2, 4—are activated by the telecommunications network 100.

According to a further exemplary embodiment of the present invention, data traffic being associated with a business partner 301' (first user 301') using a private access point name (APN) (first access point name 201) is detected, by the serving gateway (SGW) entity 122, as high priority traffic. However, data traffic being associated with an internet user 302' (second user 302') using an internet access point name (APN) (second access point name 202) is detected, by the serving gateway (SGW) entity 122, as low priority traffic. Hence, the first traffic priority information is assigned to the (low priority) downlink data packets associated with the internet access point name 202 and the second traffic priority information is assigned to the (high priority) data traffic associated with the business partner access point name 201. Thereby, the data traffic associated with the business partner 301' and data traffic associated with internet users 302' may have the same value of allocation and retention priority (ARP) level. However, according to the present invention, the downlink data packets are detected, by the serving gateway (SGW) entity 122, as high or low priority traffic independent of the allocation and retention priority (ARP). It is thereby advantageously possible according to the present invention that—based on the differentiation of access point names (APNs) by the serving gateway (SGW) entity 122—the data traffic being transmitted to the business partner 301' via the private access point name (APN) 201 (illustrated by reference numeral 301) is not subject to throttling in case of an overload situation at the mobility management entity (MME) 121, whereas the data traffic related the internet access point name (APN) 202 is subject to throttling in case of the overload situation at the mobility management entity (MME) 121.

According to another exemplary embodiment of the present invention, downlink data packets associated with an internet multimedia subsystem (IMS) access point name (APN) for Voice over Long Term Evolution (VoLTE) (third access point name 203) is treated with a higher priority than the downlink data packets associated with the Internet access point name (APN) 202 such that the downlink data packets associated with the internet multimedia subsystem (IMS) access point name (APN) for Voice over Long Term Evolution (VoLTE) 203 are forwarded (as illustrated by reference numeral 303) and especially neither throttled, nor discarded in case of an overload situation at the mobility management entity (MME) 121.

Figure 3:
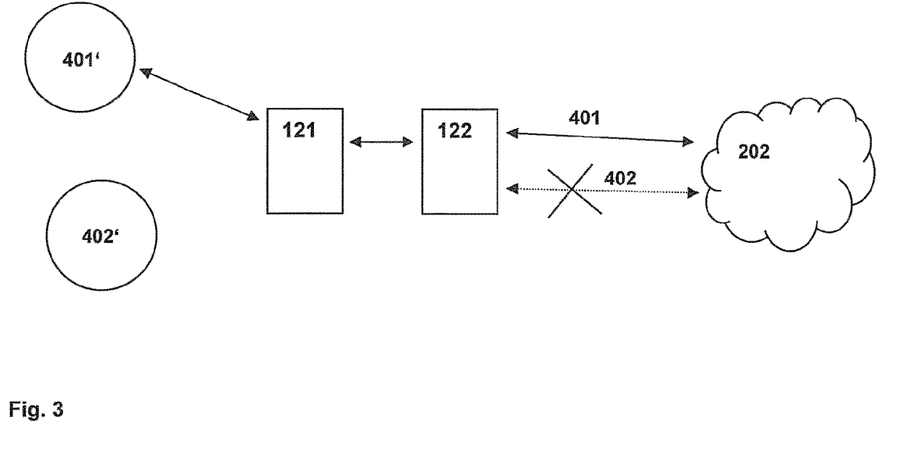
FIG. 3 schematically illustrates the situation of the traffic priority information being related to at least one user location of a user equipment according to an exemplary embodiment.

In FIG. 3, the situation of the traffic priority information being related to at least one user location of a user equipment according to exemplary embodiments of the inventive method is schematically illustrated. Here, the serving gateway (SGW) entity 122 is configured to detect the downlink data packets being directed to military buildings, hospitals, etc. (illustrated by a traffic area 401')—according to predefined configurations and based on the last tracking area reported to the serving gateway (SGW) entity 122—as high priority traffic directed to the second user equipment 22, in case the second user equipment 22 is located in the tracking area 401'. The downlink data packets being directed to the second user equipment 22 are therefore being forwarded, and in particular not being throttled or discarded (see reference numeral 401). The serving gateway (SGW) entity 122 is furthermore configured to detect the downlink data packets, being directed to a further tracking area 402', as low priority traffic directed to the first user equipment 21 in case of the first user equipment 21 being located in the further tracking area 402'. Therefore, the downlink data notification (DDN) messages associated with the data traffic directed to the first user equipment 21 are throttled or discarded (illustrated by reference numeral 402) in case of an overload situation at the mobility management entity (MME) 121.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced overload protection in a telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein a subset of user equipments of the plurality of user equipments is in idle or inactive mode, wherein the telecommunications network comprises a mobility management entity and a serving gateway entity, wherein the method comprises:

receiving, by the serving gateway entity, a plurality of downlink data packets for the subset of user equipments from at least one packet data network, wherein the plurality of downlink data packets comprise payload data for transmission using communication bearers;

assigning, by the telecommunications network, a first traffic priority to a first part of the plurality of downlink data packets and a second traffic priority to a second part of the plurality of downlink data packets, wherein the first traffic priority of the first part of the plurality of downlink data packets is lower than the second traffic priority of the second part of the plurality of downlink data packets;

throttling, by the serving gateway entity, during an overload time interval, first downlink data notification (DDN) requests to the mobility management entity, the first DDN requests being related to the first part of the plurality of downlink data packets; and transmitting, by the serving gateway entity, during the overload time interval, second DDN requests to the mobility management entity, the second DDN requests being related to the second part of the plurality of downlink data packets;

wherein the method further comprises: detecting, by the serving gateway entity, a first user location of a first user equipment of the subset of user equipments based the first part of the plurality of downlink data packets and a second user location of a second user equipment of the subset of user equipments based on the second part of the plurality of downlink data packets; and wherein the first traffic priority of the first part of the plurality of downlink data packets is based on the first user location and the second traffic priority of the second part of the plurality of downlink data packets is based on the second user location.

2. The method according to claim 1, wherein the overload time interval is retrieved, by the serving gateway entity, from a DDN acknowledge message received from the mobility management entity in response to a DDN request.

3. The method according to claim 1, wherein the method further comprises:

activating, by the telecommunications network, the communication bearers for transmission of the second part of the plurality of data packets to the subset of user equipments; and transmitting, from the serving gateway entity to the respective user equipments of the subset of user equipments, the second part of the plurality of data packets using the communication bearers.

4. The method according to claim 1, wherein the plurality of downlink data packets comprise payload data for transmission using communication bearers according to different allocation and retention priority (ARP) levels.

5. The method according to claim 1, wherein the method further comprises:

detecting, by the serving gateway entity, a first access point name (APN) based on the first part of the plurality of downlink data packets and a second APN based on the second part of the plurality of downlink data packets;

wherein the first traffic priority of the first part of the plurality of downlink data packets is further based on the first APN and the second traffic priority of the second part of the plurality of downlink data packets is further based on the second APN.

6. The method according to claim 1, wherein the second user location is detected based on an identification of predefined location configuration data and/or based on a last tracking area being reported to the serving gateway entity.

7. The method according to claim 1, wherein the method further comprises:

detecting, by the serving gateway entity, first subscriber class information based on the first part of the plurality of downlink data packets and second subscriber class information based on the second part of the plurality of downlink data packets;

wherein the first traffic priority of the first part of the plurality of downlink data packets is further based on the first subscriber class information and the second traffic priority of the second part of the plurality of downlink data packets is further based on the second subscriber class information.

8. The method according to claim 7, wherein the first subscriber class information and the second subscriber class priority information are each based on a combination of a respective allocation and retention priority (ARP) level and a respective traffic handling priority (THP) level.

9. A system, comprising:
a telecommunications network; and
a plurality of user equipments;

wherein the telecommunications network is configured to provide communication services to the plurality of user equipments, wherein any data transmission of payload data between the telecommunications network and any of the plurality of user equipments requires at least one communication bearer being established involving the respective user equipment;

wherein the telecommunications network comprises a mobility management entity and a serving gateway entity;

wherein the serving gateway entity of the telecommunications network is configured to receive, from at least one packet data network, a plurality of downlink data packets for a subset of user equipments being in idle or inactive mode, wherein the plurality of downlink data packets comprise payload data for transmission using communication bearers;

wherein the telecommunications network is configured to assign a first traffic priority to a first part of the plurality of downlink data packets and a second traffic priority to a second part of the plurality of downlink data packets, wherein the first traffic priority of the first part of the plurality of downlink data packets is lower than the second traffic priority of the second part of the plurality of downlink data packets;

wherein the serving gateway entity is configured to throttle, during an overload time interval, first downlink data notification (DDN) requests to the mobility management entity, the first DDN requests being related to the first part of the plurality of downlink data packets;

wherein the serving gateway entity is configured to transmit, during the overload time interval, second DDN requests to the mobility management entity, the second DDN requests being related to the second part of the plurality of downlink data packets;

wherein the serving gateway entity is further configured to detect a first user location of a first user equipment of the subset of user equipments based the first part of the plurality of downlink data packets and a second user location of a second user equipment of the subset of user equipments based on the second part of the plurality of downlink data packets; and wherein the first traffic priority of the first part of the plurality of downlink data packets is based on the first user location and the second traffic priority of the second part of the plurality of downlink data packets is based on the second user location.

10. The system according to claim 9, wherein the telecommunications network is configured to activate the communication bearers for transmission of the second part of the plurality of data packets to the subset of user equipments; wherein the serving gateway entity is configured to transmit the second part of the plurality of data packets to the respective user equipments of the subset of user equipments using the communication bearers.

11. One or more non-transitory computer-readable mediums having processor-executable instructions stored thereon for enhanced overload protection in a telecommunications network, wherein the telecommunications network is configured to provide communication services to a plurality of user equipments, wherein any data transmission of payload data between the telecommunications network and any of the plurality of user equipments requires at least one communication bearer being established involving the respective user equipment, wherein a subset of user equipments of the plurality of user equipments is in idle or inactive mode, wherein the telecommunications network comprises a mobility management entity and a serving gateway entity, wherein the processor-executable instructions, when executed by a processor, facilitate performance of the following:

receiving, by the serving gateway entity, a plurality of downlink data packets for the subset of user equipments from at least one packet data network, wherein the plurality of downlink data packets comprise payload data for transmission using communication bearers;

assigning, by the telecommunications network, first traffic priority to a first part of the plurality of downlink data packets and second traffic priority to a second part of the plurality of downlink data packets, wherein the first traffic priority of the first part of the plurality of downlink data packets is lower than the second traffic priority of the second part of the plurality of downlink data packets;

throttling, by the serving gateway entity, during an overload time interval, first downlink data notification (DDN) requests to the mobility management entity, the first DDN requests being related to the first part of the plurality of downlink data packets; and transmitting, by the serving gateway entity, during the overload time interval, second DDN requests to the mobility management entity, the second DDN requests being related to the second part of the plurality of downlink data packets;

wherein the processor-executable instructions, when executed, further facilitate: detecting, by the serving gateway entity, a first user location of a first user equipment of the subset of user equipments based the first part of the plurality of downlink data packets and a second user location of a second user equipment of the subset of user equipments based on the second part of the plurality of downlink data packets; and wherein the first traffic priority of the first part of the plurality of downlink data packets is based on the first user location and the second traffic priority of the second part of the plurality of downlink data packets is based on the second user location.

12. The method according to claim 1, wherein the plurality of downlink data packets comprise payload data for transmission using communication bearers according to a same allocation and retention priority (ARP) level.

13. The method according to claim 1, wherein the first traffic priority is further based on: a first access point name (APN), or a combination of a first allocation and retention priority (ARP) level and a first traffic handling priority (THP) level; and wherein the second traffic priority is further based on: a second APN, or a combination of a second ARP level and a second THP level.

* * * * *